United States Patent
Tsai et al.

(10) Patent No.: US 9,598,137 B2
(45) Date of Patent: Mar. 21, 2017

(54) BICYCLE FRONT FORK ASSEMBLY

(71) Applicant: TEKTRO TECHNOLOGY CORPORATION, Changhua County (TW)

(72) Inventors: Szu-Fang Tsai, Taichung (TW); Chia-Wen Hsieh, Changhua County (TW)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 0 days.

(21) Appl. No.: 14/820,202

(22) Filed: Aug. 6, 2015

(65) Prior Publication Data

US 2016/0272269 A1 Sep. 22, 2016

(30) Foreign Application Priority Data

Mar. 19, 2015 (TW) .............................. 104108790 A

(51) Int. Cl.
| | | |
|---|---|---|
| *B62K 21/02* | (2006.01) | |
| *B62K 3/02* | (2006.01) | |
| *B62L 3/02* | (2006.01) | |
| *B62K 19/38* | (2006.01) | |

(52) U.S. Cl.
CPC ............. *B62K 21/02* (2013.01); *B62K 3/02* (2013.01); *B62K 19/38* (2013.01); *B62L 3/023* (2013.01)

(58) Field of Classification Search
CPC .................................... B62K 21/02; B62K 3/01
USPC ............... 280/275, 276, 279, 281.1
See application file for complete search history.

(56) References Cited

U.S. PATENT DOCUMENTS

| | | | | |
|---|---|---|---|---|
| 5,478,100 A * | 12/1995 | McDermitt, Jr. | ...... | B62K 19/06 280/281.1 |
| 6,572,131 B2 * | 6/2003 | Fujii | ...... | B62L 1/14 188/24.11 |
| 2007/0068744 A1 * | 3/2007 | Tsai | ...... | B62L 1/10 188/24.12 |
| 2008/0035431 A1 * | 2/2008 | Vroomen | ...... | B62K 19/38 188/24.21 |
| 2008/0252038 A1 * | 10/2008 | Blomme | ...... | B62J 99/00 280/281.1 |
| 2010/0051758 A1 * | 3/2010 | Onogi | ...... | B62J 6/18 248/58 |
| 2011/0248469 A1 * | 10/2011 | Chubbuck | ...... | B62K 21/02 280/276 |

(Continued)

FOREIGN PATENT DOCUMENTS

TW       CN 201457643 U   *   5/2010

*Primary Examiner* — Jacob Knutson

(74) *Attorney, Agent, or Firm* — Muncy, Geissler, Olds & Lowe, P.C.

(57) ABSTRACT

A bicycle front fork assembly includes a stem and a front fork. The front fork includes a fork crown, a first fork leg and a second fork leg. The stem is connected to the fork crown. The top end of the first fork leg and the second fork leg are connected to the two ends of the fork crown, respectively. The bottom end of the first fork leg and the second fork leg are connected to two ends of a hub which are opposite to each other, respectively. A disk brake rotor has a center coaxially connected to one end of the hub close to the first fork leg. A disc brake caliper is partially disposed within an accommodating recess formed on a surface of the first fork leg facing the second fork leg and close to the disk brake rotor.

6 Claims, 8 Drawing Sheets

(56) References Cited

U.S. PATENT DOCUMENTS

2012/0032413 A1* 2/2012 Bell .................. B62K 19/38
280/264
2014/0265225 A1* 9/2014 D'Aluisio .............. B62K 21/02
280/276

* cited by examiner

BICYCLE FRONT FORK ASSEMBLY

CROSS-REFERENCE TO RELATED APPLICATIONS

This non-provisional application claims priority under 35 U.S.C. §119(a) on Patent Application No(s). 104108790 filed in Taiwan, R.O.C. on Mar. 19, 2015, the entire contents of which are hereby incorporated by reference.

TECHNICAL FIELD

The disclosure relates to a bicycle front fork assembly, more particularly to a bicycle front fork assembly having an accommodating recess where a disc brake caliper is partially disposed.

BACKGROUND

In terms of conventional bicycles, two manners of connecting a disc brake caliper 400 to a front fork 500 are shown in FIG. 7 and FIG. 8. Please refer to FIG. 7. Each bottom end of the two fork legs 510 of the front fork are connected to two ends of a hub 200, respectively. A disk brake rotor 300 has a center which is coaxially connected to one end of the hub 200. One of the fork legs 510 is closer to the disk brake rotor 300 than the other fork leg 510. The fork leg 510 closer to the disk brake rotor 300 has two mounting flanges 520 protruding out from a back surface of the fork leg 510. An interval is between the two mounting flanges 520. A connecting seat 600 is connected and fixed to the mounting flanges 520 by bolts or screws B penetrating through the connecting seat 600 and the mounting flanges 520 along a direction parallel to an axial direction of the hub 200. The disc brake caliper 400 is connected and fixed to the connecting seat 600 so that the disc brake caliper 400 is connected to the mounting flanges 520. A brake hose 410 is connected to the disc brake caliper 400.

Next, please refer to FIG. 8, a structure of the front fork assembly in FIG. 8 is similar to a structure of the front fork assembly in FIG. 7. The difference between the structure of the front fork assembly in FIG. 8 and the structure of the front fork assembly in FIG. 7 is that bolts or screws B penetrate through the connecting seat 600 and the mounting flanges 520 along a direction parallel to a radial direction of the hub 200. The disc brake caliper 400 is connected and fixed to the connecting seat 600 so that the disc brake caliper 400 is connected to the mounting flanges 520.

The disc brake calipers 400 in FIG. 7 and FIG. 8 are located on an outer surface of the fork leg 510 of the front fork 500. The volume of the disc brake calipers 400 protruding out from the outer surface of the fork leg 510 is too large such that an air resistance is generated when the bicycle is ridden by rider. Moreover, the disc brake caliper 400 is easily damaged or the fixing structure between the disc brake caliper 400 and the fork leg 510 may become loose by an external impact, and therefore this affects braking. In addition, the shape of disc brake caliper 400 protruding out from the outer surface of the fork leg 510 has no aesthetic feeling for consumers.

SUMMARY

According to one embodiment of the present disclosure, a bicycle front fork assembly includes a stem and a front fork. The front fork includes a fork crown, a first fork leg and a second fork leg. The fork crown has a connecting portion and two ends which are opposite to each other. The connecting portion is located between the two ends of the fork crown. An end of the stem is connected to the connecting portion of the fork crown. The first fork leg has a first top end and a first bottom end which are opposite to each other. The second fork leg has a second top end and a second bottom end which are opposite to each other. The first top end and the second top end are connected to the two ends of the fork crown, respectively. The first bottom end and the second bottom end are connected to two ends of a hub which are opposite to each other, respectively. A disk brake rotor has a center coaxially connected to one of the two ends of the hub being closer to the first fork leg than the other one of the two ends of the hub. A disc brake caliper is partially disposed within an accommodating recess formed on a surface of the first fork leg facing the second fork leg and close to the disk brake rotor.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
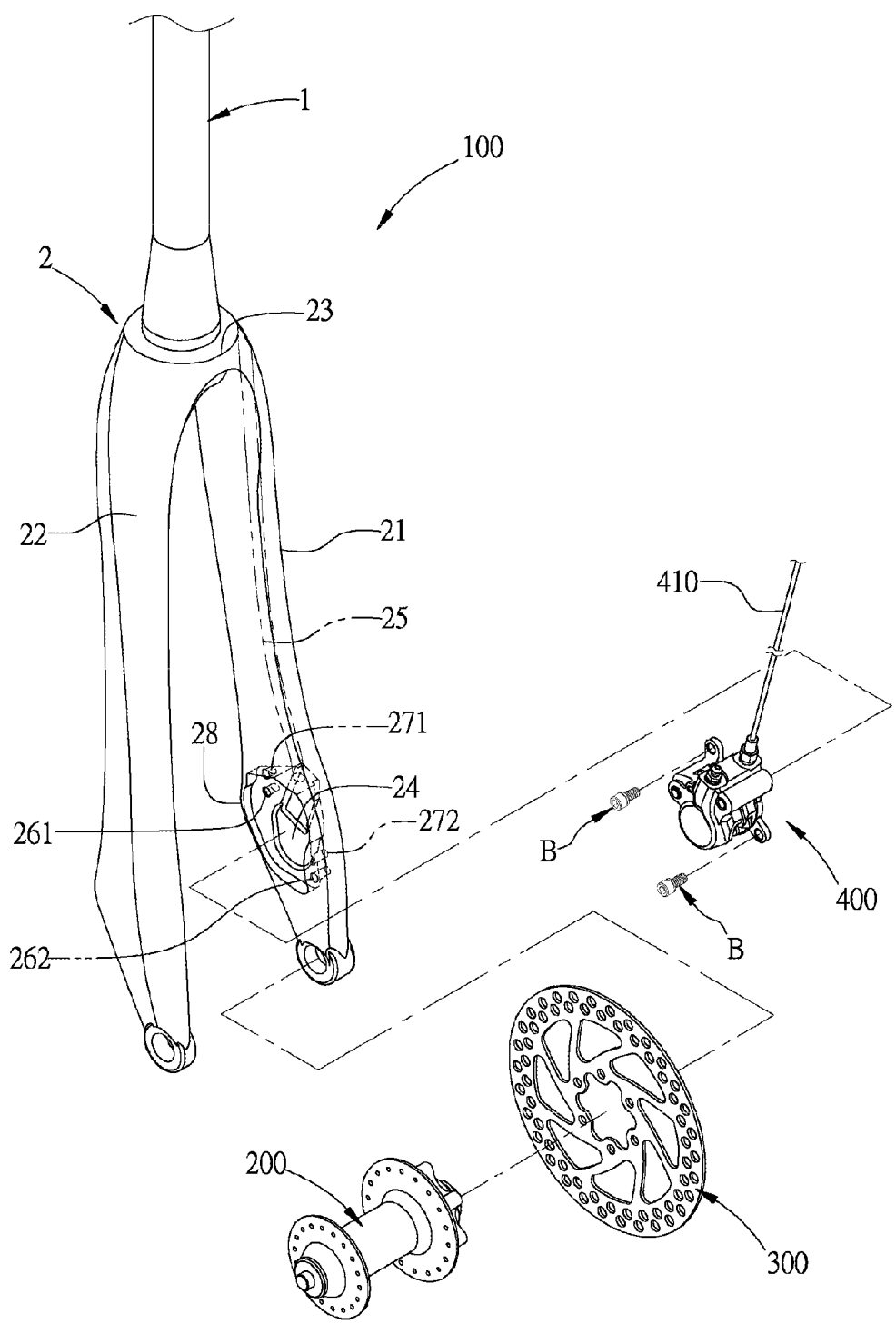
FIG. 1 is a schematic exploded view of a bicycle front fork assembly according to an embodiment of the disclosure.
Figure 2:
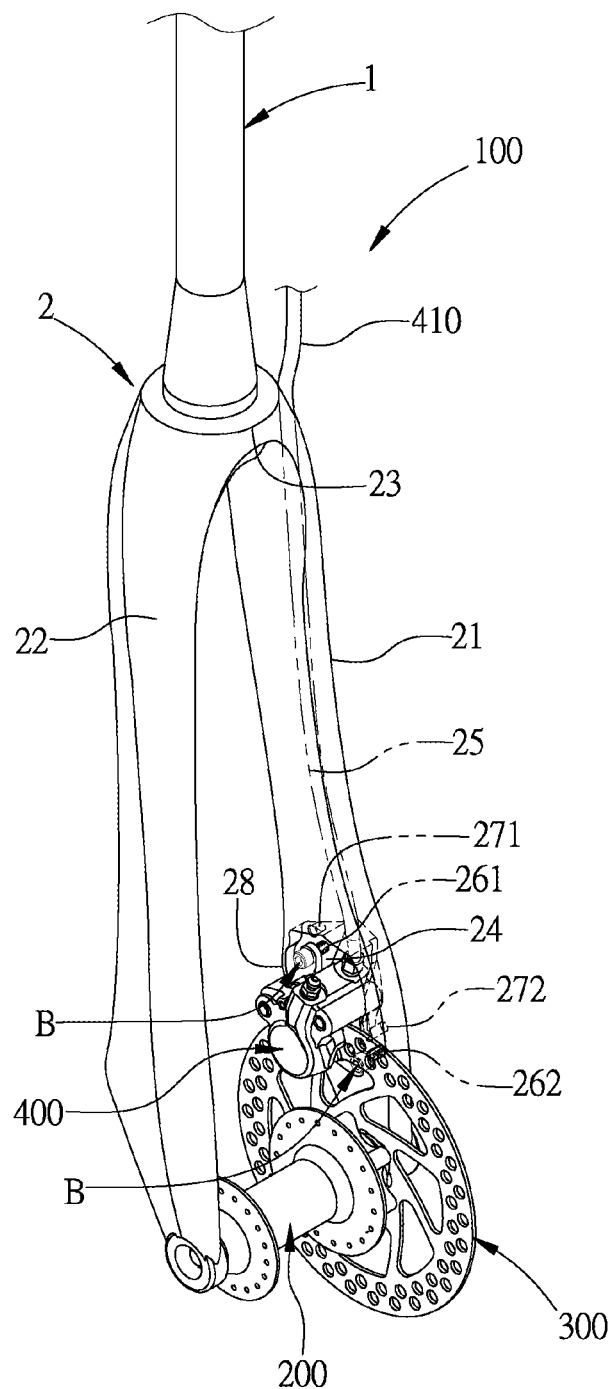
FIG. 2 is a schematic perspective view of the bicycle front fork assembly according to the embodiment of the disclosure.
Figure 3:
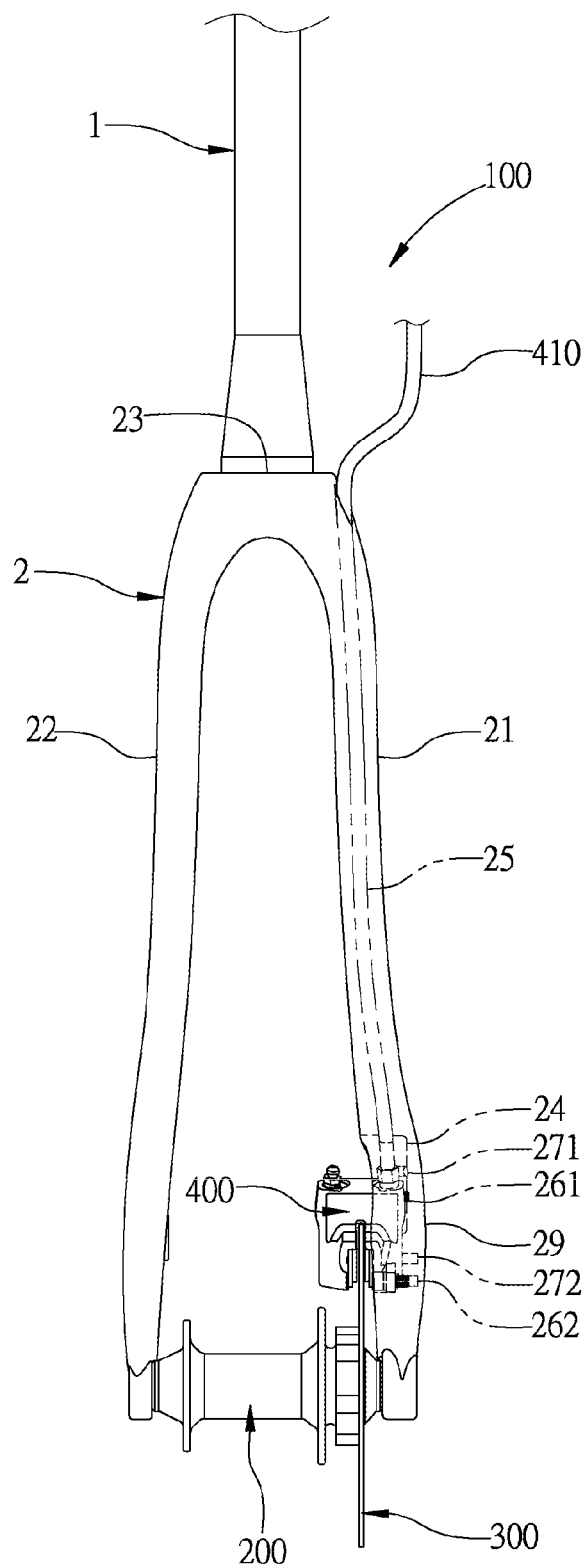
FIG. 3 is a front view of the bicycle front fork assembly according to the embodiment of the disclosure.
Figure 4:
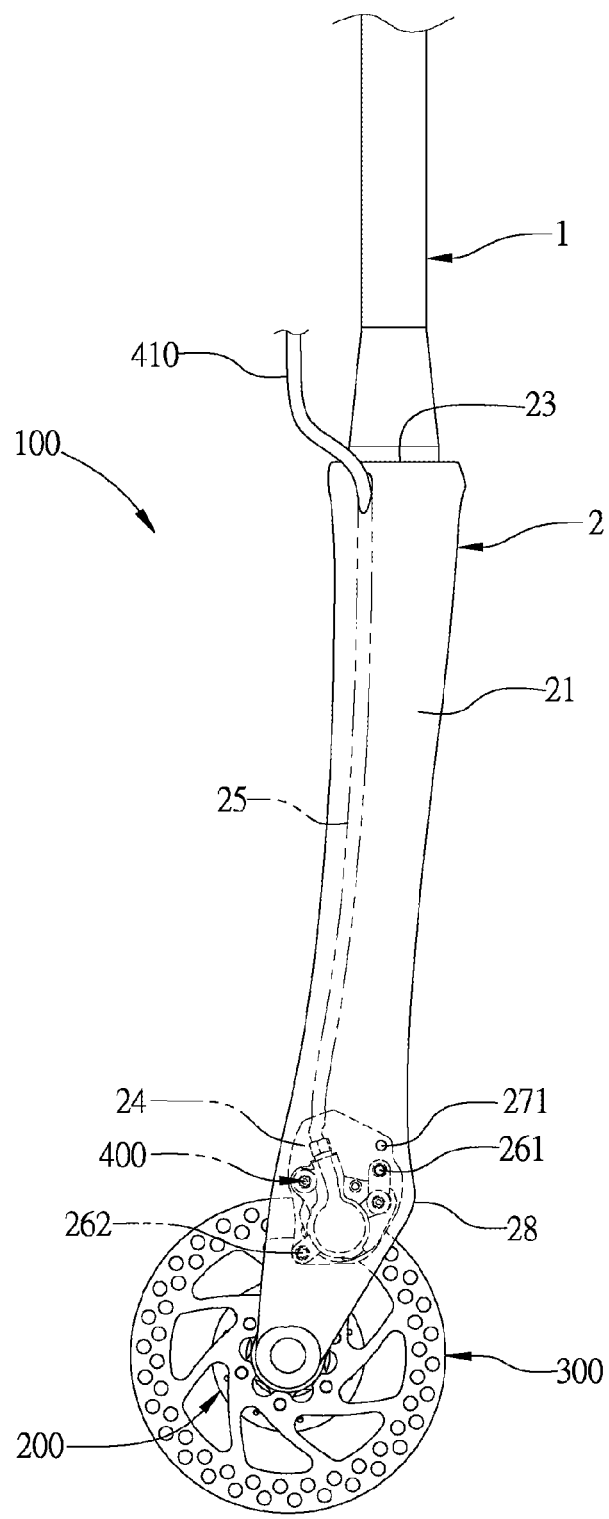
FIG. 4 is a side view of the bicycle front fork assembly according to the embodiment of the disclosure.
Figure 5:
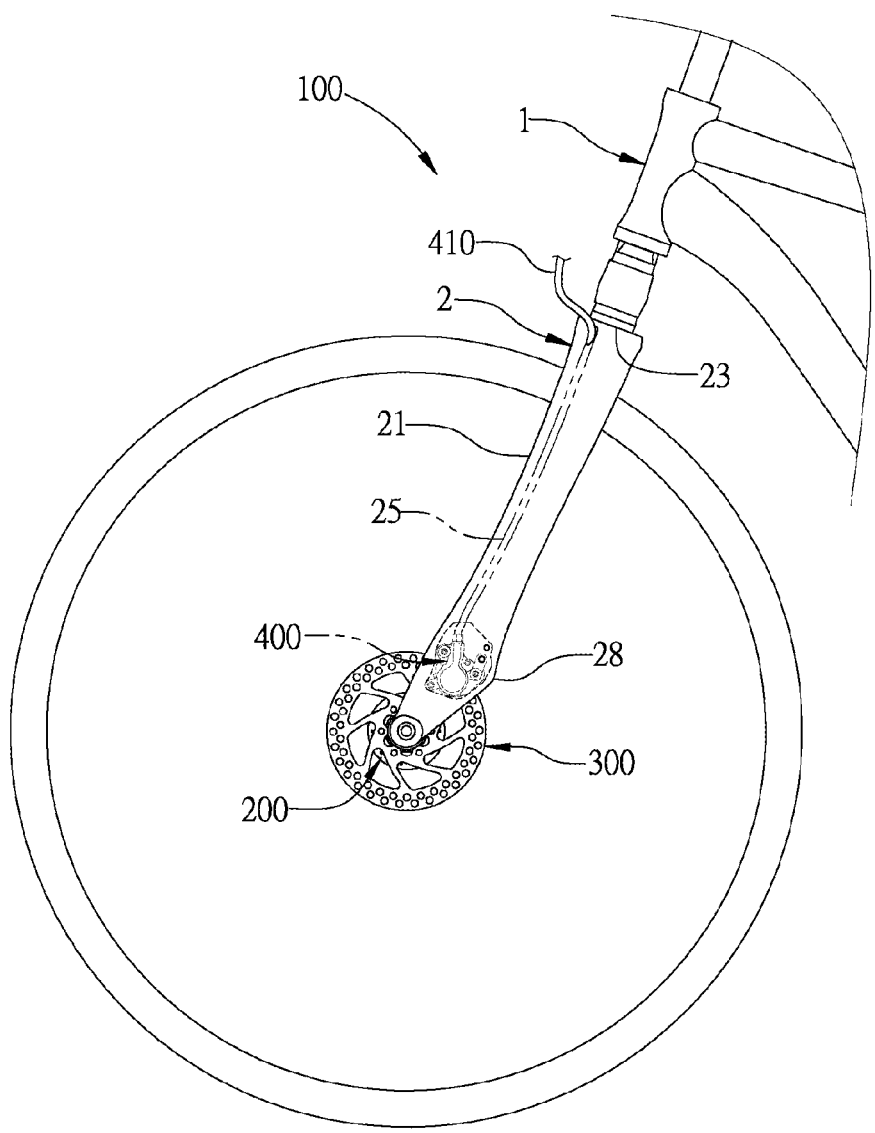
FIG. 5 is a side view of a front part of a bicycle with the bicycle front fork assembly according to the embodiment of the disclosure.
Figure 6:
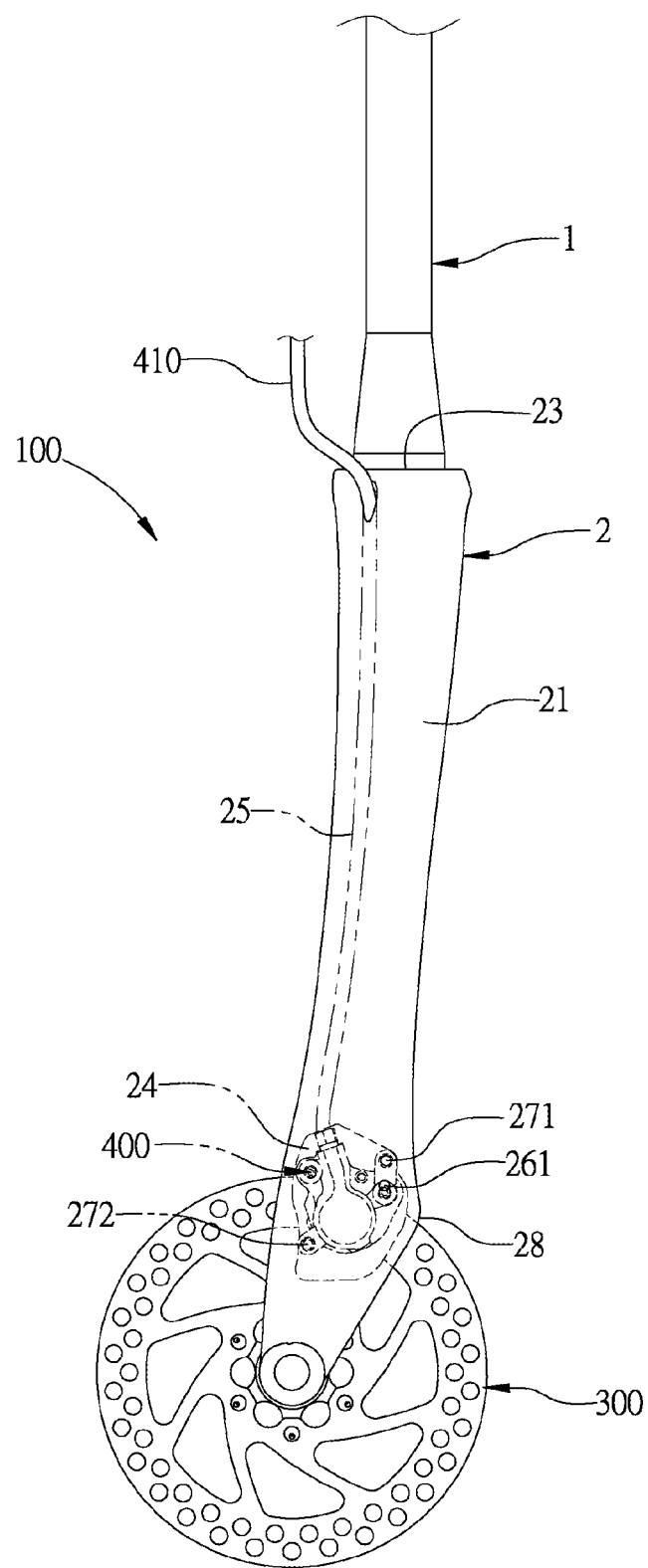
FIG. 6 is a side view of the bicycle front fork assembly for a disc brake rotor with a large diameter according to the embodiment of the disclosure.
Figure 7:
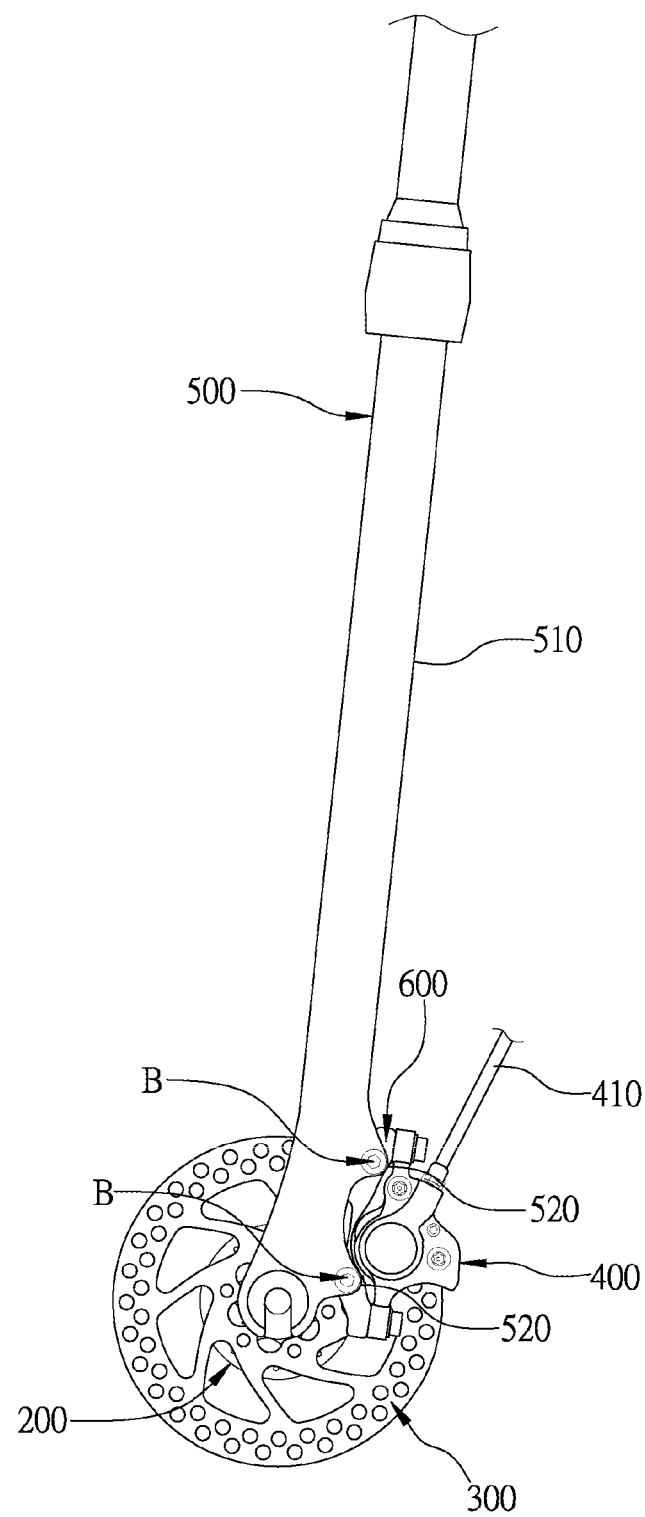
FIG. 7 is a side view of a bicycle front fork assembly according to a conventional bicycle.
Figure 8:
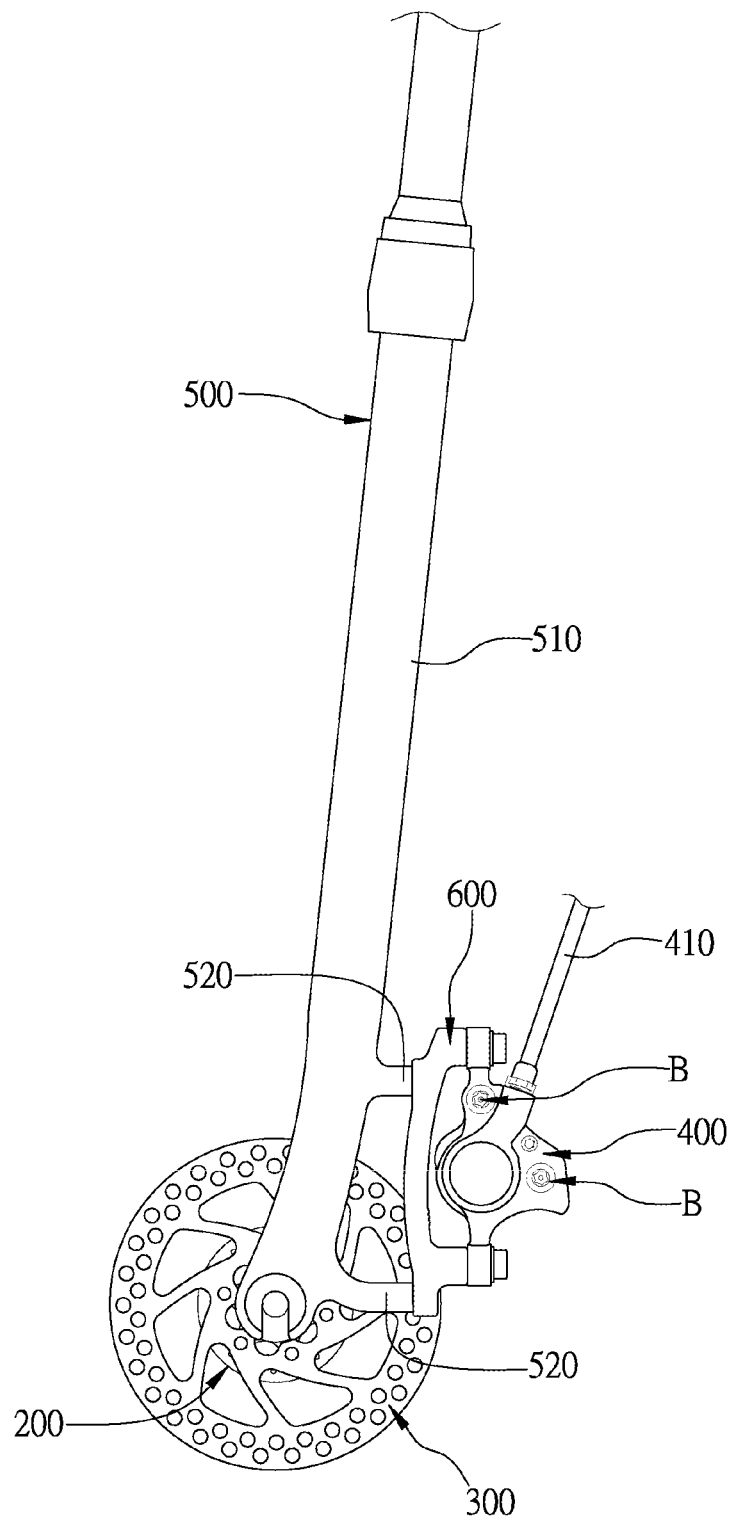
FIG. 8 is a side view of a bicycle front fork assembly according to another conventional bicycle.

The following describes a bicycle front fork assembly 100 of an embodiment of the present disclosure. Please refer to FIG. 1 to FIG. 6. FIG. 1 is a schematic exploded view of a bicycle front fork assembly according to an embodiment of the disclosure, FIG. 2 is a schematic perspective view of the bicycle front fork assembly according to the embodiment of the disclosure, FIG. 3 is a front view of the bicycle front fork assembly according to the embodiment of the disclosure, FIG. 4 is a side view of the bicycle front fork assembly according to the embodiment of the disclosure, FIG. 5 is a side view of a front part of a bicycle with the bicycle front fork assembly according to the embodiment of the disclosure, and FIG. 6 is a side view of the bicycle front fork assembly for a disc brake rotor with a large diameter according to the embodiment of the disclosure. In the first embodiment of the present disclosure, the bicycle front fork assembly 100 includes a stem 1 and a front fork 2. The stem 1 has a top end and a bottom end which are opposite to each other. The top end of the stem 1 can be connected to a handle bar (not shown). The bottom end of the stem 1 is connected to the front fork 2.

The front fork 2 includes a first fork leg 21, a second fork leg 22 and a fork crown 23. The first fork leg 21 has a first top end and a first bottom end which are opposite to each other. The second fork leg 22 has a second top end and a second bottom end which are opposite to each other. The fork crown 23 has a connecting portion and two ends which are opposite to each other. The connecting portion is located between the two ends of the fork crown 23. The bottom end of the stem 1 is connected to the connecting portion of the fork crown 23. The first top end of the first fork leg 21 and the second top end of the second fork leg 22 are connected to two ends of the fork crown 23, respectively. A distance between the connecting portion and the first bottom end or the second bottom end is greater than a distance between the end of the fork crown 23 and the first bottom end or the second bottom end. The first bottom end of the first fork leg 21 and the second bottom end of the second fork leg 22 are connected to two ends of a hub 200 which are opposite to each other, respectively. A disk brake rotor 300 has a center coaxially connected to one of the two ends of the hub 200 that is closer to the first fork leg 21 than the other one of the two ends of the hub 200. The first fork leg 21 further has an inner surface and an outer surface which are opposite to each other. The inner surface is facing the second fork leg 22 and is close to the disk brake rotor 300. An accommodating recess 24 is formed on the inner surface of the first fork leg 21 so that a disc brake caliper 400 can be partially disposed within the accommodating recess 24.

A channel 25 is located inside the first fork leg 21. One end of the channel 25 is communicated with the accommodating recess 24. The other end of the channel 25 extends toward the stem 1 and extends out of the first fork leg 21 to expose to the outside. Therefore, a brake hose 410 of the disc brake caliper 400 can be disposed in and go through the channel 25.

Moreover, at least one fixing structure is located in the accommodating recess 24. In the embodiment of the disclosure, the number of the fixing structures, for example, is two for fixing the disc brake caliper 400 located at two different positions in the accommodation recess 24 to squeeze the disk brake rotors 300 with different diameters. For example, one of the fixing structures is located at a position closer to the stem 1 than the other fixing structure. Moreover, in this embodiment, one of the fixing structures has two first threaded holes 261, 262. An interval is between the two first threaded holes 261, 262. The first threaded hole 261 is closer to the fork crown 23 than the first threaded hole 262. As shown in FIG. 4 and FIG. 5, the disc brake caliper 400 is able to be fixed in the accommodating recess 24 by the combination of the two first threaded holes 261, 262 and two fasteners, such as bolts or screws B. Thus, the disc brake caliper 400 can squeeze the disk brake rotor 300 with smaller diameter. The other one of the fixing structures has two second threaded holes 271, 272. An interval is between the two second threaded holes 271, 272. The second threaded hole 271 is closer to the fork crown 23 than the second threaded hole 272. Also, the second threaded hole 271 is closer to the fork crown 23 than the first threaded hole 261, and the second threaded hole 272 is closer to the fork crown 23 than the first threaded hole 262. As shown in FIG. 6, the disc brake caliper 400 is able to be fixed in the accommodating recess 24 by the combination of the two second threaded holes 271, 272 and two fasteners, such as bolts or screws B. Hence, the disc brake caliper 400 can squeeze the disk brake rotor 300 with larger diameter. Therefore, the fixing position of the disc brake caliper 400 in the accommodating recess 24 can be altered so that the disc brake caliper 400 can squeeze the disk brake rotors 300 with different diameters.

Furthermore, the first fork leg 21 has a first reinforced portion 28 and a second reinforced portion 29. The first reinforced portion 28 is adjacent to the accommodating recess 24 and protrudes out from a rear surface of the first fork leg 21. The rear surface of the first fork leg 21 faces a rear end of the bicycle. The second reinforced portion 29 is adjacent to the accommodating recess 24 and protrudes out from the outer surface of the first fork leg 21. Therefore, structural strength of the bicycle front fork assembly 100 in the disclosure is strengthened by the dispositions of the first reinforced portion 28 and the second reinforced portion 29.

According to the bicycle front fork assembly disclosed in the embodiments of the disclosure, the disc brake caliper is partially disposed in the accommodating recess of the first fork leg so that just a small portion of the disc brake caliper is located outside of the surface of the first fork leg. Therefore, the air resistance generated by the disc brake caliper when riding the bicycle is decreased. In other words, the shape of the bicycle front fork is smoother. Moreover, a possibility that the disc brake caliper is damaged or the fixing structure between the disc brake caliper and the fork leg become loose by an external impact is decreased.

Moreover, the first reinforced portion and the second reinforced portion of the first fork leg increase the structural strength of the portion close to the accommodating recess of the first fork leg. Therefore, the risk caused by bending or fracture of the bicycle front fork assembly due to insufficient structural strength of the portion close to the accommodating recess of the first fork leg is decreased.

What is claimed is:
1. A bicycle front fork assembly, comprising:
   a stem; and
   a front fork comprising a fork crown, a first fork leg and a second fork leg, the fork crown having a connecting portion and two ends which are opposite to each other, the connecting portion located between the two ends of the fork crown, an end of the stem connected to the connecting portion of the fork crown, the first fork leg having a first top end and a first bottom end which are opposite to each other, the second fork leg having a second top end and a second bottom end which are opposite to each other, the first top end and the second top end connected to the two ends of the fork crown, respectively, the first bottom end and the second bottom end connected to two ends of a hub which are opposite to each other, respectively, a disc brake rotor having a center coaxially connected to one of the two ends of the hub being closer to the first fork leg than the other one of the two ends of the hub, a disc brake caliper partially disposed within an accommodating recess formed on an inner surface of the first fork leg facing the second fork leg and close to the disc brake rotor;

wherein the accommodating recess is defined by a closed-shape inner side-wall and a bottom surface, and does not penetrate an outer surface of the first fork leg away from the second fork leg.

2. The bicycle front fork assembly of claim 1, wherein the first fork leg further has at least one fixing structure.

3. The bicycle front fork assembly of claim 1, wherein the first fork leg has a first fixing structure and a second fixing structure, a distance between the first fixing structure and the first bottom end is shorter than a distance between the second fixing structure and the first bottom end.

4. The bicycle front fork assembly of claim 1, wherein the first fork leg has a channel located inside the first fork leg, one end of the channel communicated with the accommodating recess, another end of the channel extends toward the stem and extends out of the first fork leg, a brake hose of the disc brake caliper goes through the channel.

5. The bicycle front fork assembly of claim 1, wherein the first fork leg has a first reinforced portion, the first reinforced portion is adjacent to the accommodating recess, and the first reinforced portion protrudes out from a rear surface of the first fork leg.

6. The bicycle front fork assembly of claim 1, wherein the first fork leg has a second reinforced portion, the second reinforced portion is adjacent to the accommodating recess, and the second reinforced portion protrudes out from an outer surface of the first fork leg away from the disc brake rotor.

* * * * *